United States Patent
Schwindt

(10) Patent No.: US 11,530,926 B2
(45) Date of Patent: Dec. 20, 2022

(54) RESTORING NAVIGATIONAL PERFORMANCE FOR A NAVIGATIONAL SYSTEM

(71) Applicant: GE Aviation Systems Limited, Cheltenham (GB)

(72) Inventor: Stefan Alexander Schwindt, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 402 days.

(21) Appl. No.: 16/737,381

(22) Filed: Jan. 8, 2020

(65) Prior Publication Data
US 2020/0225048 A1 Jul. 16, 2020

(30) Foreign Application Priority Data

Jan. 11, 2019 (EP) .................................. 19151355

(51) Int. Cl.
*G01C 21/34* (2006.01)
*G01S 19/21* (2010.01)
*G01S 19/49* (2010.01)

(52) U.S. Cl.
CPC ........ *G01C 21/3415* (2013.01); *G01S 19/215* (2013.01); *G01S 19/49* (2013.01)

(58) Field of Classification Search
CPC .... G01C 21/3415; G01S 19/215; G01S 19/49
USPC ....................................................... 701/472
See application file for complete search history.

(56) References Cited

U.S. PATENT DOCUMENTS

| | | | |
|---|---|---|---|
| 5,394,333 A | 2/1995 | Kao | |
| 8,065,074 B1 | 11/2011 | Liccardo | |
| 8,922,427 B2 | 12/2014 | Dehnie et al. | |
| 9,182,495 B2 | 11/2015 | Stevens | |
| 9,507,026 B2 | 11/2016 | Nichols | |
| 9,849,978 B1 | 12/2017 | Carmack et al. | |
| 9,851,724 B2 | 12/2017 | Bianchi et al. | |
| 10,094,930 B2 | 10/2018 | Schipper et al. | |
| 2003/0034901 A1 | 2/2003 | Griffin | |
| 2017/0158213 A1 | 6/2017 | Mathews | |
| 2017/0357009 A1 | 12/2017 | Raab et al. | |
| 2019/0243002 A1* | 8/2019 | Song | B60Q 9/00 |

FOREIGN PATENT DOCUMENTS

ES 2612008 T3 * 5/2017 ............ G01S 19/07

OTHER PUBLICATIONS

Robert Kuhn, Extended European Search Report dated Jul. 11, 2019, in related European Application No. 19151355.5, 13 pages, Germany.

* cited by examiner

*Primary Examiner* — Isaac G Smith
(74) *Attorney, Agent, or Firm* — McGarry Bair PC

(57) ABSTRACT

A method of restoring navigational performance for a navigational system, the method comprising receiving by a first navigational system and a second navigational system a collection of data points to establish a real-time navigational route for the aircraft, comparing navigational performance values and/or drift ranges and establishing a new navigational route based on the collection of data points.

25 Claims, 5 Drawing Sheets

RESTORING NAVIGATIONAL PERFORMANCE FOR A NAVIGATIONAL SYSTEM

CROSS REFERENCE TO RELATED APPLICATION(S)

This application claims the benefit of European Patent Application No. EP 19151355.5, filed Jan. 11, 2019, which is incorporated herein by reference in its entirety.

TECHNICAL FIELD

The disclosure relates to a method of restoring navigational performance for a moving vehicle with a navigational system in response to a spoofed signal, and more specifically establishing a new navigational route.

BACKGROUND

In general, satellite-based communication and navigation systems provide location and time information for nautical, aeronautical, locomotive, and automotive vessels. Satellite communication and navigation systems can occur anywhere on or near the Earth where there is an unobstructed line of sight between the vessel and one or more satellites. Satellite communication and navigation systems have a variety of applications on land, at sea, and in the air.

Aircraft rely on satellite communication for navigation and information (e.g., weather) systems. Spoofing occurs when a signal is sent to the aircraft to intentionally feed misinformation to the navigation and information systems of the aircraft. For example, a spoofed satellite navigation signal may attempt to cause an aircraft to fly off course. Detecting when spoofing occurs and maintaining navigational capabilities in the event of a spoofing attack is beneficial to circumventing the misinformation.

BRIEF DESCRIPTION

Aspects and advantages of the invention will be set forth in part in the following description, or may be obvious from the description, or may be learned through practice of the invention.

In one aspect, the disclosure relates to a method of restoring navigational performance for a moving vehicle with a navigational system in response to a spoofed signal, the method comprising receiving by a first navigational system and a second navigational system, each located within the vehicle, a collection of data points to establish a real-time navigational route for the moving vehicle, determining a drift range between a planned navigational route and the real-time navigational route, disabling the first navigational system when the drift range is greater than a predetermined error range determining a last known location based on the collection of data points, and establishing a new navigational route based on the last known location using the second navigational system.

In another aspect the disclosure relates to a method of restoring navigational performance for an aircraft with a navigational system in response to a spoofed signal, the method comprising receiving by a first navigational system and a second navigational system a collection of data points to establish a real-time navigational route for the aircraft, determining an actual navigational performance value associated with the real-time navigational route, comparing the actual navigational performance value to a required navigational performance value, determining a last known location based on the collection of data points when the actual navigation performance value is outside a desired percent error of the required navigational performance value, and establishing a new navigational route based on the last known location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

The present disclosure is related to a method for restoring navigational performance in the event a navigational system has been spoofed. The method as described herein is related to determining a drift range between a first navigational system and a second navigational system. For exemplary purposes as described herein, the first navigational system is a Global Navigational Satellite System (GNSS) and the second navigational system is an Inertial Navigation System (INS). While this description is primarily directed towards use on an aircraft, it is also applicable to any vehicle or environment which would utilize navigational systems that can undergo a spoofing attack including on land or at sea.

Figure 1:
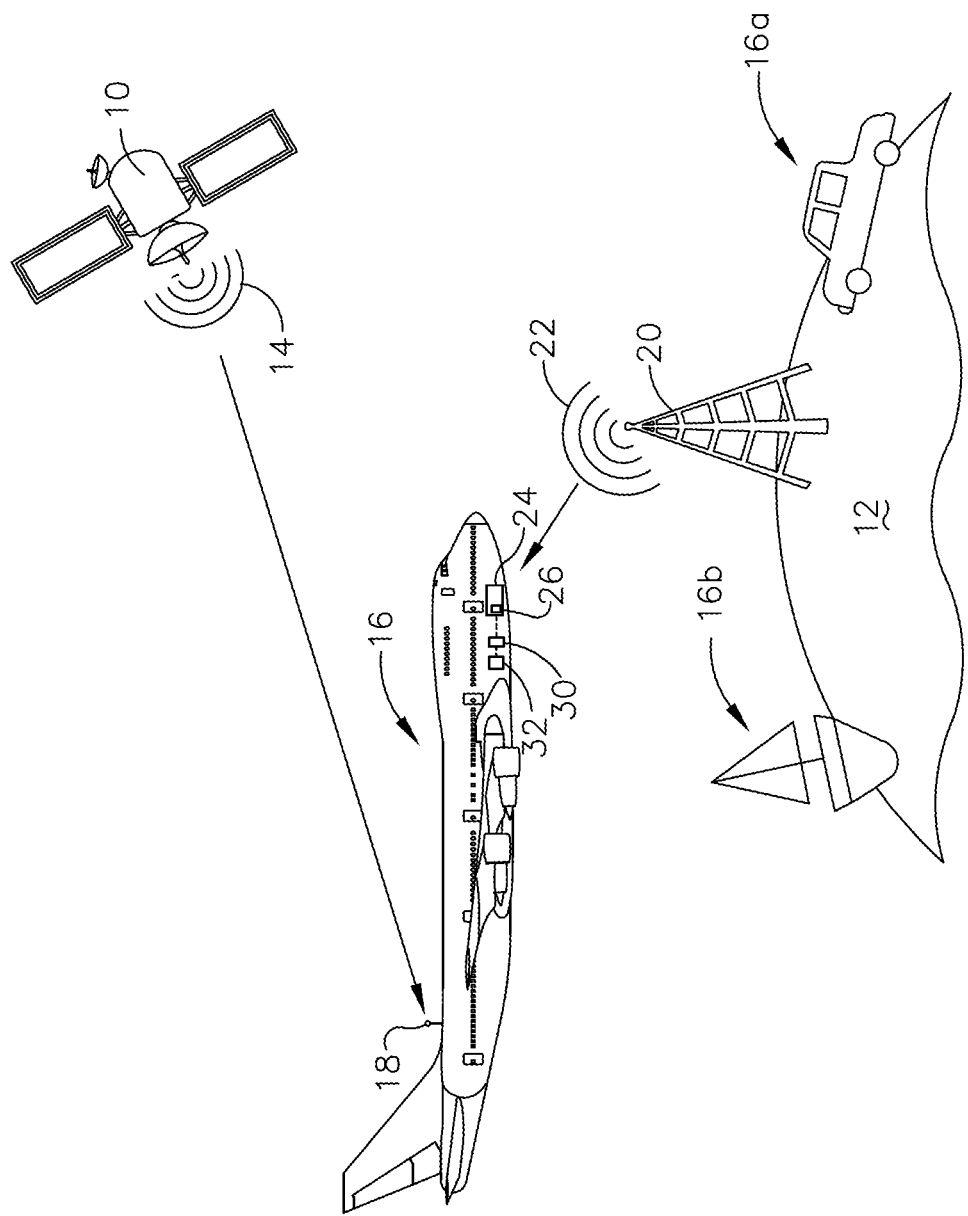
FIG. 1 is a diagram of an aircraft in flight and having multiple navigational systems including a first navigational system and a second navigational system.

FIG. 1 illustrates a satellite 10 in orbit around the earth 12. The satellite 10 emits a satellite signal 14. The satellite 10 can be any type of satellite, including but not limited to geostationary satellites, Galileo satellites, COMPASS MEO satellites, GPS satellites, GLONASS satellites, NAVIC satellites, QZSS satellites or BeiDou-2 satellites. A moving vehicle is illustrated as an aircraft 16 in flight. The aircraft 16 can include a receiver, by way of non-limiting example a radio antenna 18, for receiving the satellite signal 14 from the satellite 10. A spoofing signal source 20 located on earth 12 can emit a spoofed satellite signal 22. While illustrated as located on earth 12, it is contemplated that a spoofing signal source 20 can be located elsewhere, including but not limited to another satellite in orbit. Furthermore, while an aircraft 16 is illustrated, the moving vehicle can be, by way of non-limiting example, a land-bound vehicle 16a or a sea-vessel 16b.

The aircraft 16 can include an onboard electronics chassis 24 for housing avionics or avionics components, including by way of non-limiting example an onboard computer 26, for use in the operation of the aircraft 16. The electronics chassis 24 can house a variety of avionics elements and protects them against contaminants, electromagnetic interference (EMI), radio frequency interference (RFI), vibrations, and the like. Alternatively or additionally, the electronics chassis 24 can have a variety of avionics mounted thereon. It will be understood that the electronics chassis 24 can be located anywhere within the aircraft 16, not just the nose as illustrated.

The aircraft 16 can further include multiple navigational systems, including at least a first navigational system 30 and a second navigational system 32. While illustrated as proximate or next to the electronics chassis 24, it should be understood that the navigational systems 30, 32 can be located anywhere in the aircraft including within the electronics chassis. The first navigational system 30 can be a satellite navigational system, by way of non-limiting example a Global Navigational Satellite System (GNSS). Exemplary satellite navigational systems include, but are not limited to, the United States' Global Positioning System (GPS), Russia's GLONASS, China's BeiDou Navigation Satellite System (BDS), and Europe's Galileo scheduled to be fully operational in 2020. The second navigational system 32 can be an onboard navigational system based on data collection during travel, by way of non-limiting example an Inertial Navigation System (INS). INS can utilize a computer, motion sensors such as accelerometers, rotation sensors such as gyroscopes, and magnetic sensors such as magnetometers to continually calculate utilizing dead reckoning (the process of calculating a current position by using a previously determine position), the position, orientation, and velocity of a moving vehicle.

Figure 2:
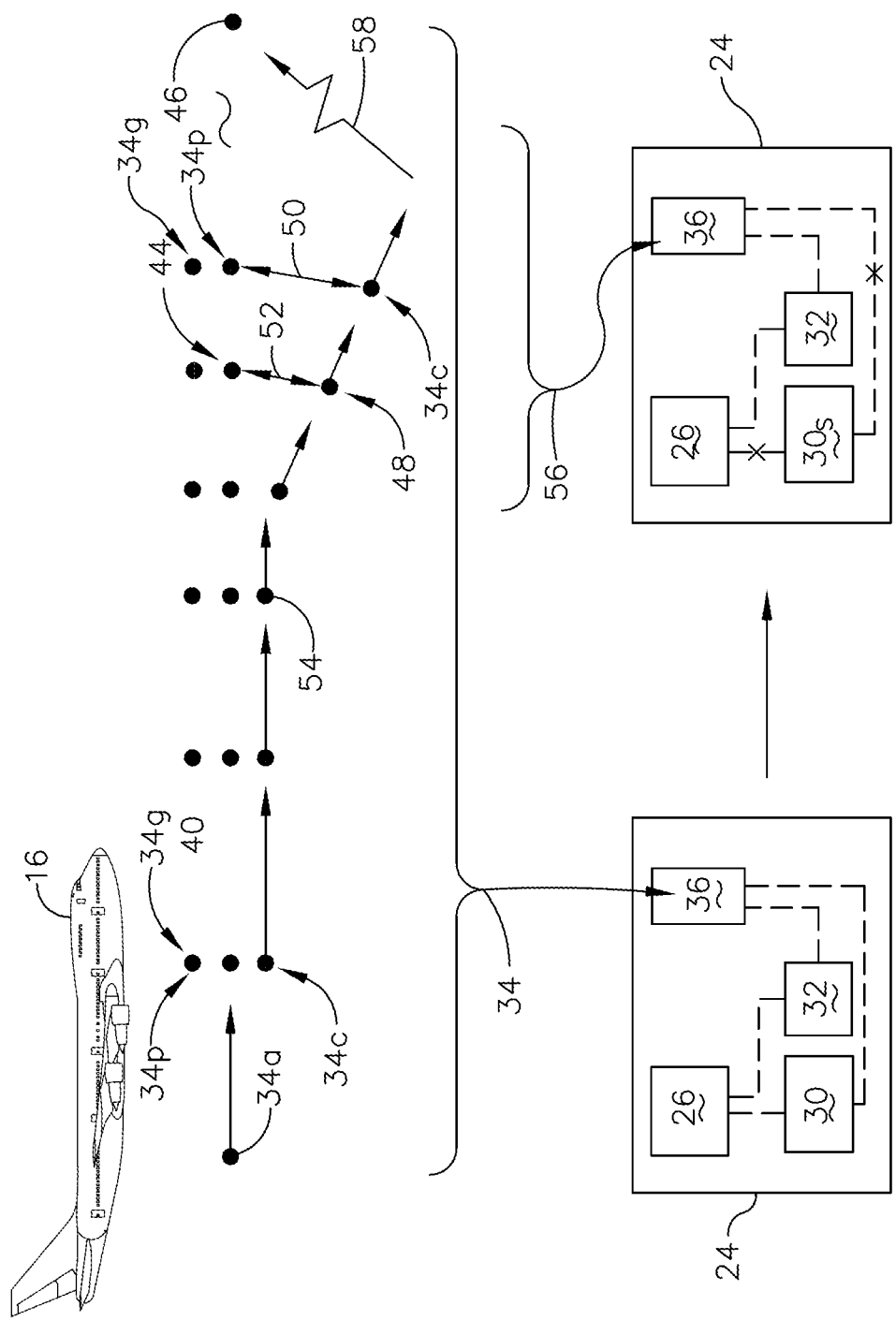
FIG. 2 is a pictorial illustration of a collection of data points associated with an exemplary movement of the aircraft from FIG. 1 received from the first navigational system and the second navigational system.

FIG. 2 pictorially illustrates a collection of data points 34 associated with an exemplary movement of the aircraft 16 received from the first navigational system 30 and the second navigational system 32 and stored in a database 36 located by way of non-limiting example in the electronics chassis 24. The collection of data points 34 can include a known initial data point 34a, by way of non-limiting example an airport from which the aircraft 16 departs, GPS data points 34g gathered by the first navigational system, and calculated data points 34c calculated by the second navigational system based on the known initial data point 34a. Data associated with the calculated data points 34c include vector data 40 (both position and speed).

A planned navigational route 44 can be stored as planned data points 34p representing a route the aircraft 16 should travel to reach a predetermined destination 46. While illustrated as side by side, the planned data points 34p, GPS data points 34g, and calculated data points 34c can overlap when the aircraft 16 is travelling along the planned navigational route 44, within some acceptable error range due to side winds or the like. A real-time navigational route 48 can be the actual path traveled by the aircraft 16. A drift range 50 can be associated with a difference between the planned data points 34p representing the planned navigational route 44 and the calculated data points 34c representing the real-time navigational route 48. A predetermined error range 52 can also be associated with a difference between the planned navigational route 44 and the real-time navigational route 48 and can be a set or variable value where when the drift range 50 becomes larger than the predetermined error range 52, the first navigational system 30 becomes disabled in order to compare the real-time navigational route 48 to the planned navigational route 44. A last known location 54 is the point at which the real-time navigational route 48 begins to deviate from the planned navigational route 44. The last known location 54 is a true location where GPS data points 38g recorded by the first navigational system 30 match calculated data points 34c recorded by the second navigational system 32.

In a spoofing event 56 where the first navigational system 30 becomes a spoofed navigational system $30_s$ the aircraft 16 can begin to deviate from the planned navigational route 44. When this occurs, restoring navigational performance by establishing a new navigational route 58 becomes necessary for a safe destination arrival of the aircraft 16.

Figure 3:
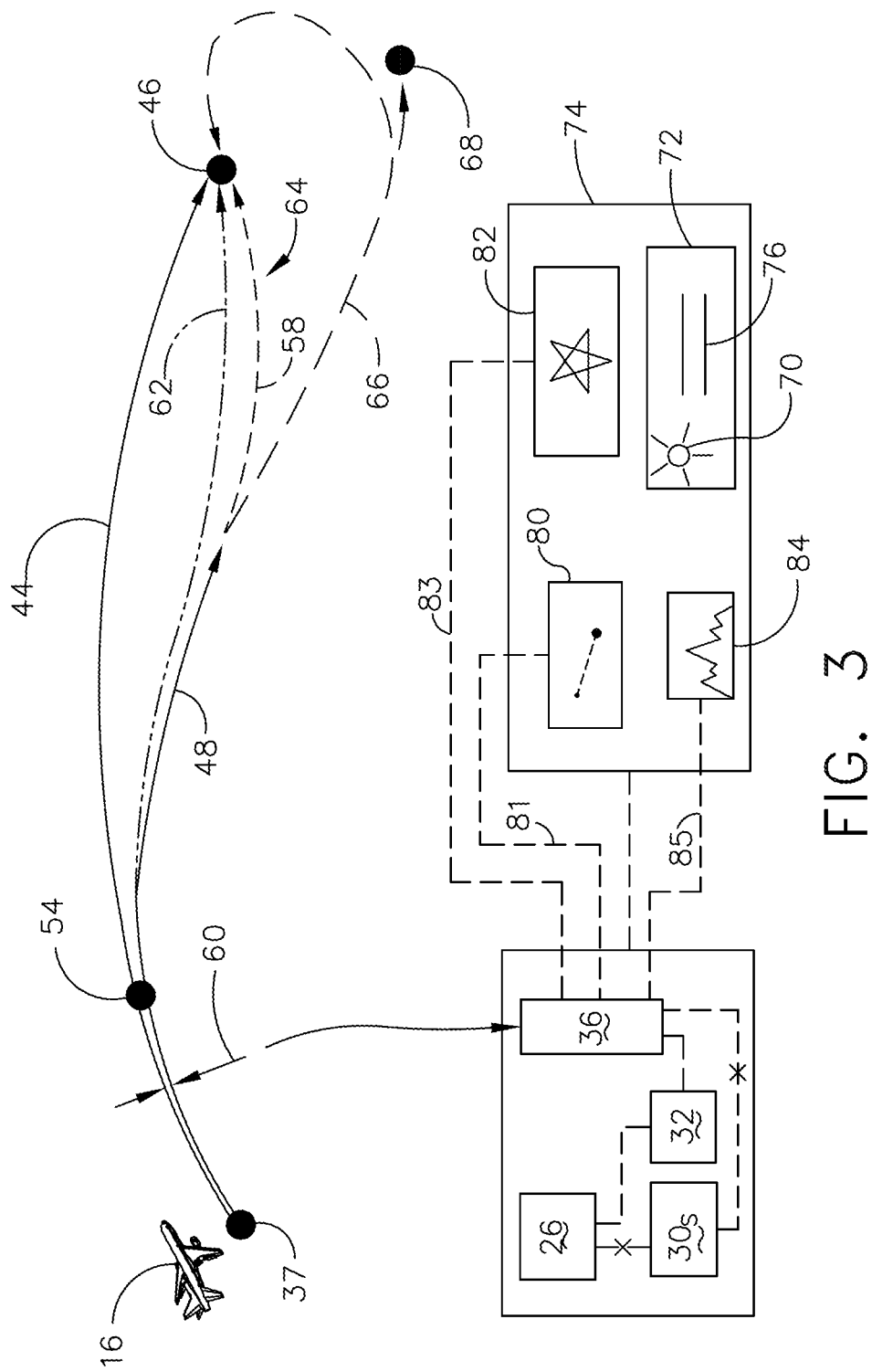
FIG. 3 is pictorial illustration of a collection of navigational routes for the aircraft of FIG. 1.

Turning to FIG. 3, a collection of navigational routes is illustrated including the planned navigational route 44, the real-time navigational route 48, and the new navigational route 58. In order to establish the new navigational route 58, an error accumulation rate (EAR) 60 can be stored in the database 36 throughout the flight. The EAR 60 is based on data collected by the motion sensors of the second navigational system 32 and provides numerical data for accurately establishing the new navigational route 58. A future EAR $60_f$ can also be calculated based on the collection of data points 34 and predictive modeling.

Furthermore, in order to establish the new navigational route 58, a required navigation performance (RNP) value, represented by a dotted line 62, can be considered. The RNP value refers to the level of performance required for a specific procedure, by way of non-limiting example landing the aircraft 16, or a specific block of airspace, by way of non-limiting example above a city. An RNP value of 10 means that a navigation system must be able to calculate its position to within a square with a lateral dimension of 10 nautical miles. An RNP value of 0.3 means the aircraft navigation system must be able to calculate its position to within a square with a lateral dimension of 3/10 of a nautical mile. The range of the RNP value is a function of onboard navigational system redundancies, a smaller RNP value is associated with a more accurate flight path and the precision with which the aircraft 16 can follow the flight path.

An actual navigation performance (ANP) value, represented by any line 64 along which the aircraft 16 actually travels, refers to the current performance of a navigation system. When the first navigational system 30 becomes a spoofed navigational system $30_s$, the ANP value may increase and continue to increase as the real-time navigational route 48 deviates from the planned navigational route 44. In establishing the new navigational route 58, the computer can continuously monitor and compare the RNP value to the ANP value until the two values are within a desired value, such as percent error of each other, for a safe arrival. Whether the RNP value need be within a percent error or less than the ANP value is determined based on the moving vehicle, in this case the aircraft 16, and the factors influencing the establishment of the new navigational route 58. By way of non-limiting example, factors can include land terrain, air space traffic, weather conditions, or the like.

In an event where a last known location 54 cannot be established in time to determine RNP and ANP values within a desired percent error, by way of non-limiting example 3%, a detour navigational route 66 can be established. It is further contemplated that the detour navigational route 66 is established when the ANP value is greater than the RNP value. The detour navigational route 66 can end in an arrival at a different destination 68 than the predetermined destination 46. Alternatively, a detour navigational route 66 can simply provide an alternative to the new navigational route 58 that ensures time for the determining the last known location 54 in order to establish equal RNP and ANP values.

In an event where the detour navigational route 66 cannot be determined, an alert 70 can be sent to a user interface 72 located by way of non-limiting example in a cockpit 74 and accessible to a pilot of the aircraft 16, with instructions 76 to switch to a manual approach. In an aspect of the disclosure herein, determining the last known location 54 can be at least done in part by using at least one of navigational aids 80, star tracking 82, or terrain matching 84. These can be stored among the collection of data points 34 already installed within the database 36 as navigational aids data 81, star tracking data 83, or terrain matching data 85, or could be input manually as the same. Determining the last known location 54 can be done by comparing the calculated data points 34c in the collection of data points 34 to at least one of the navigational aids data 81, star tracking data 83, or terrain matching data 85.

Figure 4:
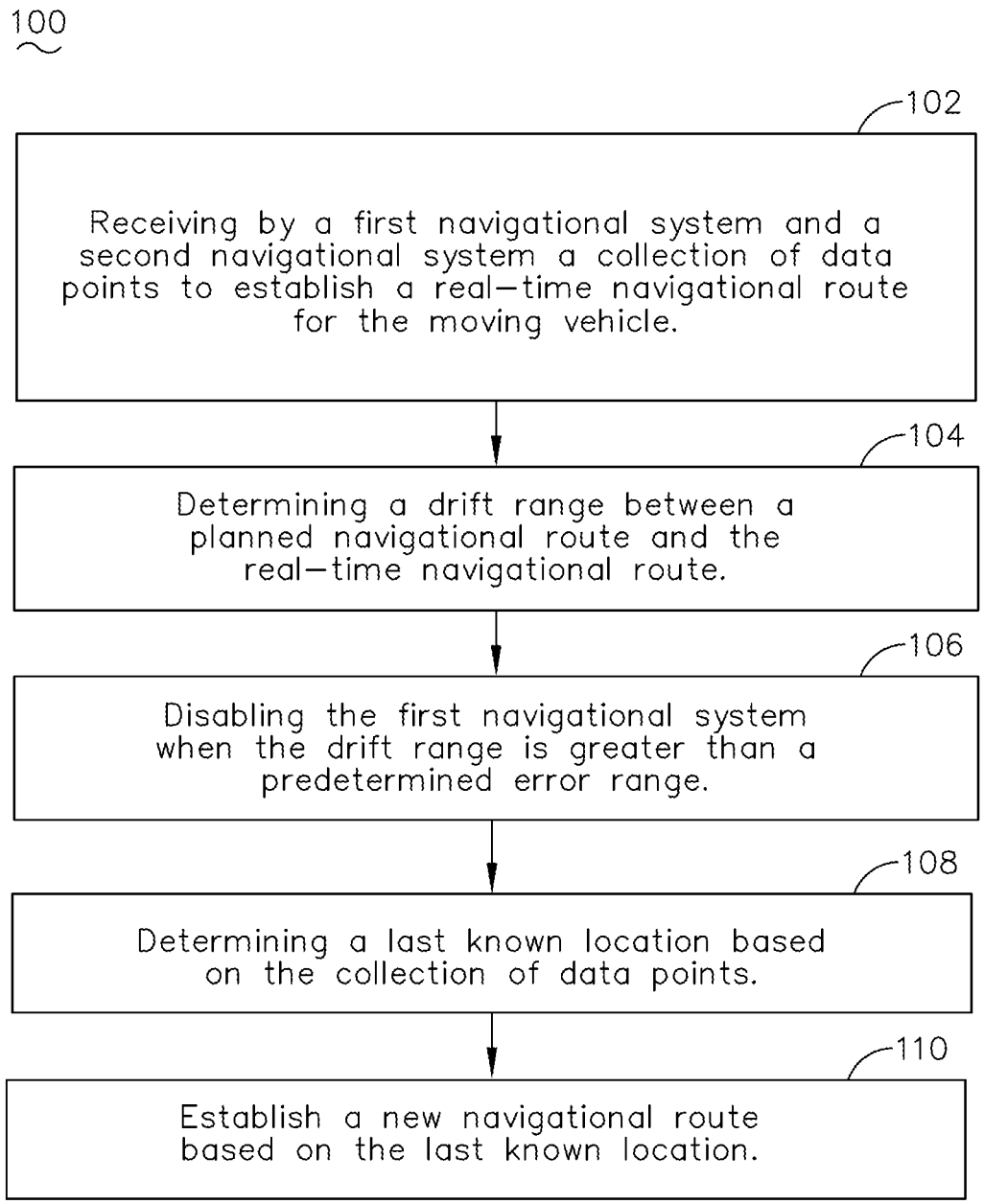
FIG. 4 is a flow chart for a method of restoring navigational performance for a navigational system according to an aspect of the disclosure herein.

FIG. 4 is a flow chart for a method 100 of restoring navigational performance for the spoofed navigational system $30_s$. The method 100 can be performed by the computer 26 on board in a non-limiting example. The method 100 includes at 102 receiving by the first navigational system and the second navigational system the collection of data points 34 to establish the real-time navigational route 48. At 104, determining an accuracy of the real-time navigational route 48 by determining the drift range 50 between the planned navigational route 44 and the real-time navigational route 48. At 106 if the drift range 50 is greater than the predetermined error range 52, the method 100 includes disabling the first navigational system 30. The last known location 54 can be determined at 108 based on the EAR 60 and the collection of data points 34. At 110 the new navigational route 58 based on the last known location 54 can be established. In other words, any differences in position declared by GPS data points 34g should be within an accepted range of the calculated data points 34c. These two sets of data points 34g, 34c should be close to each other in a normal state, however they will exceed an error margin, the predetermined error range 52, when spoofing occurs in which case the first navigational system will become disabled.

Figure 5:
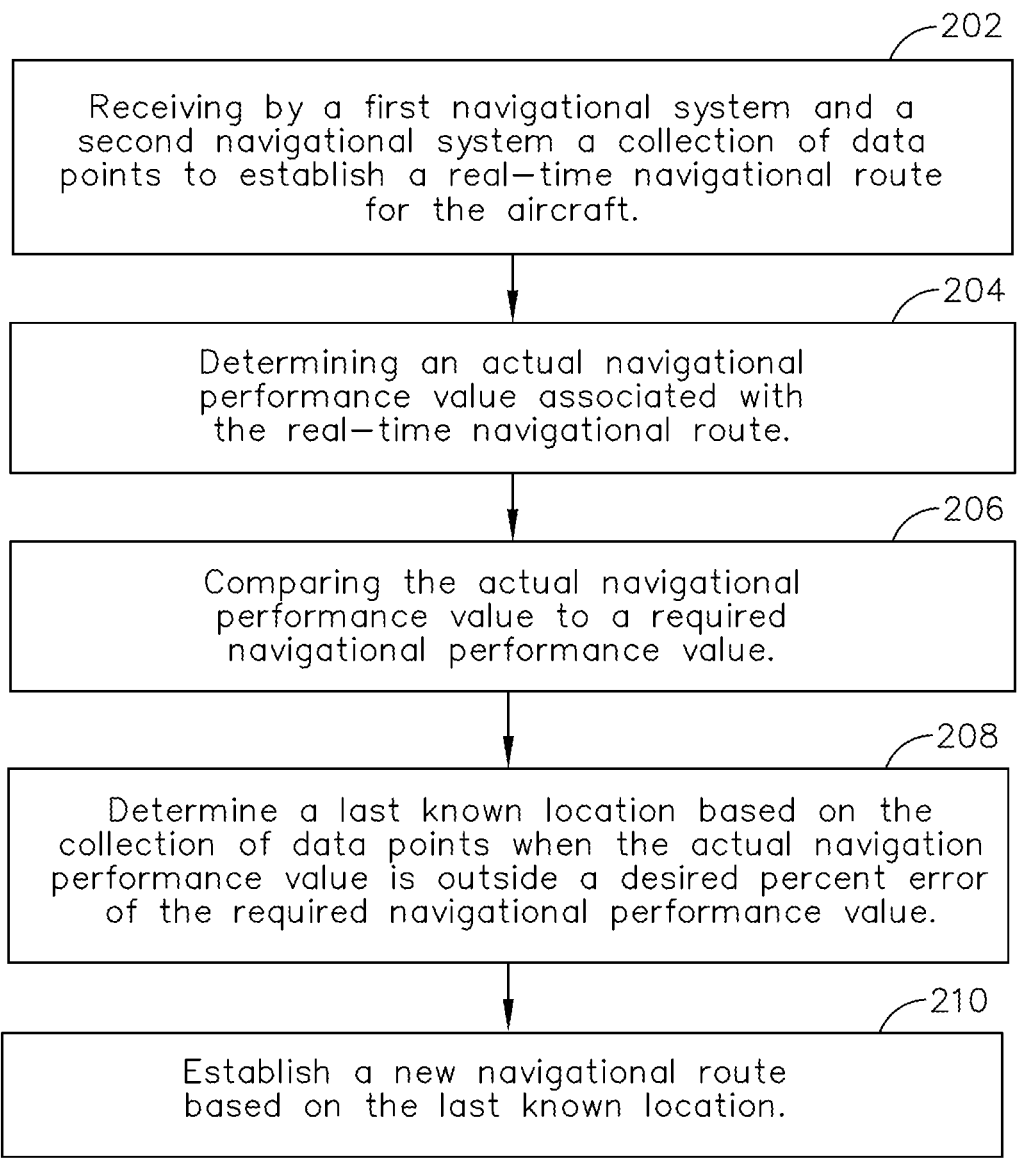
FIG. 5 is a flow chart for a method of restoring navigational performance for a navigational system according to another aspect of the disclosure herein.

FIG. 5 is a flow chart for a method 200 of restoring navigational performance for the spoofed navigational system $30_s$. The method 200 can be performed by the computer 26 on board in a non-limiting example. The method 200 includes at 202 receiving by the first navigational system 30 and the second navigational system 32 the collection of data points 34 to establish the real-time navigational route 48. At 204, the ANP value 64 associated with the real-time navigational route 48. At 206 determining an accuracy of the real-time navigational route 48 by comparing the ANP value 64 to the RNP value. The last known location 54 can be determined at 208 based on the collection of data points 34 when the ANP value 64 is outside the desired percent error of the RNP value as described herein. At 210 the new navigational route 58 based on the last known location 54 can be established.

It should be understood that the methods as described herein can be combined in any manner to establish a new navigational route based on the last known location.

Benefits associated with the method of restoring navigational performance for an aircraft with a navigational system in response to a spoofed signal enable existing sensors associated with, by way of non-limiting example INS, to be utilized to establish a new navigational route. Additionally a pilot can be alerted of possible spoofing and manually input data to restore the navigational performance. Allowing pilots access to information regarding possible spoofing increases safety and security for the aircraft along with passengers on board. Furthermore a reduction of missed approaches during landing procedures can be a result of an informed pilot. Informed communication with air traffic control in a case of a spoofing attack more quickly enables both pilots and air traffic control workers to communicate with each other and identify and fix any errors in navigation that may occur due to an attempted spoofing attack.

Furthermore, the method as disclosed herein can be implemented and carried out with existing parts on any aircraft, satellite, or structures provided on earth. The cost of implementing the method is therefore less than replacing the existing GNSS infrastructure with cryptographically signed transmissions where each signal is implanted with a digital signature. Proper cryptographic authentication of signals requires hardware and software changes globally. Modifying existing satellites in orbit is difficult. The disclosure herein enables an update for receivers that is "backwards compatible" when improvement in spoofing detection is necessary.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A method of restoring navigational performance for a moving vehicle with a navigational system in response to a spoofed signal, the method comprising receiving by a first navigational system and a second navigational system, each located within the vehicle, a collection of data points to establish a real-time navigational route for the moving vehicle; determining a drift range between a planned navigational route and the real-time navigational route; disabling the first navigational system when the drift range is greater than a predetermined error range; determining a last known location based on the collection of data points; and establishing a new navigational route based on the last known location using the second navigational system.

2. The method of any preceding clause, further comprising determining an actual navigational performance value based on the collection of data points.

3. The method of any preceding clause, further comprising determining an accuracy of the real-time navigational route by comparing the actual navigational performance value to a required navigational performance value to determine if the actual navigational performance value is within a desired percent error of the required navigational performance value.

4. The method of any preceding clause, further comprising continuously recalibrating the second navigational system until the required navigational performance value is within the desired percent error of the actual navigational performance value based on a future error accumulation rate.

5. The method of any preceding clause, further comprising determining the last known location using at least one of navigational aids data, star tracking data, or terrain matching data.

6. The method of any preceding clause, further comprising comparing the at least one of navigational aids data, star tracking data, or terrain matching data to the collection of data points.

7. The method of any preceding clause, further comprising determining whether an accurate determining of the last known location can be established in time for a destination arrival.

8. The method of any preceding clause, wherein when the last known location cannot be determined in time for a destination arrival, establishing a detour navigational route to provide time required to determine the last known location.

9. The method of any preceding clause, wherein when the detour navigational route cannot be determined sending an alert to a user interface to switch to a manual approach.

10. The method of any preceding clause, wherein the first navigational system is a Global Navigation Satellite System (GNSS) and the second navigational system is an Inertial Navigation System (INS).

11. The method of any preceding clause, further comprising calculating an error accumulation rate for the second navigational system based on the collection of data points.

12. The method of any preceding clause, further comprising recalibrating the second navigational system based on the error accumulation rate.

13. The method of any preceding clause, further comprising predicting a future error accumulation rate before a destination arrival.

14. A method of restoring navigational performance for an aircraft with a navigational system in response to a spoofed signal, the method comprising receiving by a first navigational system and a second navigational system a collection of data points to establish a real-time navigational route for the aircraft; determining an actual navigational performance value associated with the real-time navigational route; comparing the actual navigational performance value to a required navigational performance value; determining a last known location based on the collection of data points when the actual navigation performance value is outside a desired percent error of the required navigational performance value; and establishing a new navigational route based on the last known location.

15. The method of any preceding clause, further comprising determining an accuracy of the real-time navigational route by determining a drift range between a planned navigational route and the real-time navigational route.

16. The method of any preceding clause, further comprising disabling the first navigational system when the drift range is greater than a predetermined drift range.

17. The method of any preceding clause, further comprising determining the last known location when the actual navigation performance value is greater than the required navigational performance value.

18. The method of any preceding clause, further comprising recalibrating the second navigational system until the required navigational performance value is within the desired percent error of the actual navigational performance value.

19. The method of any preceding clause, further comprising determining the last known location of the aircraft using at least one of navigational aids data, star tracking data, or terrain matching data.

20. The method of any preceding clause, further comprising comparing the at least one of navigational aids data, star tracking data, or terrain matching data to the collection of data points.

21. The method of any preceding clause, further comprising determining whether an accurate determining of the last known location of the aircraft can be established in time for a destination arrival.

22. The method of any preceding clause, wherein in an event where the last known location of the aircraft cannot be determined in time for a destination arrival, establishing a detour navigational route to provide a time required to determine the last known location.

23. The method of any preceding clause, further comprising predicting a future error accumulation rate before a destination arrival.

24. The method of any preceding clause, wherein in an event where the detour navigational route cannot be determined sending an alert to a user interface with instructions to switch to a manual approach.

25. The method of any preceding clause, wherein the first navigational system is a Global Navigation Satellite System (GNSS) and the second navigational system is an Inertial Navigation System (INS).

What is claimed is:

1. A method of restoring navigational performance for a moving vehicle with a navigational system, the method comprising:
  receiving by a first navigational system, located within the vehicle, a first collection of data points;
  receiving by an inertial navigation system (INS), located within the vehicle, a second collection of data points;
  with a computer:
    processing the first and second set collection of data points to establish a real-time navigational route for the moving vehicle;
    comparing the second collection of data points to a planned navigational route to determine a drift range between the planned navigational route and the real-time navigational route;
    determining that the drift range is greater than a predetermined error range;
    disabling the first navigational system;
    determining a last known location based on the first collection of data points; and
  establishing a new navigational route based on the last known location using the INS.

2. The method of claim 1, further comprising determining via the computer an actual navigational performance value based on the first and second collection of data points.

3. The method of claim 2, further comprising determining via the computer an accuracy of the real-time navigational route by comparing the actual navigational performance value to a required navigational performance value to determine if the actual navigational performance value is within a desired percent error of the required navigational performance value.

4. The method of claim 3, further comprising continuously recalibrating via the computer the INS until the required navigational performance value is within the desired percent error of the actual navigational performance value based on a future error accumulation rate.

5. The method of claim 1, further comprising determining via the computer the last known location using at least one of navigational aids data, star tracking data, or terrain matching data.

6. The method of claim 5, further comprising via the computer comparing the at least one of navigational aids data, star tracking data, or terrain matching data to the collection of data points.

7. The method of claim 1, further comprising determining via the computer whether an accurate determining of the last known location can be established in time for a destination arrival.

8. The method of claim 7, wherein when the last known location cannot be determined in time for a destination arrival, establishing via the computer a detour navigational route to provide time required to determine the last known location.

9. The method of claim 8, wherein when the detour navigational route cannot be determined sending via the computer an alert to a user interface to switch to a manual approach.

10. The method of claim 1, wherein the first navigational system is a Global Navigation Satellite System (GNSS).

11. The method of claim 1 further comprising calculating via the computer an error accumulation rate for the INS based on the collection of data points.

12. The method of claim 11 further comprising recalibrating via the computer the INS based on the error accumulation rate.

13. The method of claim 12 further comprising predicting via the computer a future error accumulation rate before a destination arrival.

14. A method of restoring navigational performance for an aircraft with a navigational system in response to a spoofed signal, the method comprising:
   receiving by a first navigational system and an inertial navigation system (INS) a collection of data points to establish a real-time navigational route for the aircraft;
   with a computer:
      determining an actual navigational performance value associated with the real-time navigational route;
      comparing the actual navigational performance value to a required navigational performance value;
      determining a spoofed signal for the first navigational system when the actual navigation performance value is outside a desired percent error of the required navigational performance value;
      determining a last known location based on the collection of data points when the spoofed signal is determined;
      disabling navigation for the first navigational system; and
   with the INS establishing a new navigational route based on the last known location.

15. The method of claim 14 further comprising determining via the computer an accuracy of the real-time navigational route by determining a drift range between a planned navigational route and the real-time navigational route.

16. The method of claim 15 wherein the disabling the first navigational system further comprises determining via the computer when the drift range is greater than a predetermined drift range.

17. The method of claim 14, further comprising determining via the computer the last known location when the actual navigation performance value is greater than the required navigational performance value.

18. The method of claim 14, further comprising recalibrating via the computer the INS until the required navigational performance value is within the desired percent error of the actual navigational performance value.

19. The method of claim 14, further comprising determining via the computer the last known location of the aircraft using at least one of navigational aids data, star tracking data, or terrain matching data.

20. The method of claim 19, further comprising comparing via the computer the at least one of navigational aids data, star tracking data, or terrain matching data to the collection of data points.

21. The method of claim 14, further comprising determining via the computer whether an accurate determining of the last known location of the aircraft can be established in time for a destination arrival.

22. The method of claim 21, wherein in an event where the last known location of the aircraft cannot be determined in time for a destination arrival, establishing via the computer a detour navigational route to provide a time required to determine the last known location.

23. The method of claim 22, further comprising predicting via the computer a future error accumulation rate before a destination arrival.

24. The method of claim 22, wherein in an event where the detour navigational route cannot be determined sending via the computer an alert to a user interface with instructions to switch to a manual approach.

25. The method of claim 14, wherein the first navigational system is a Global Navigation Satellite System (GNSS).

* * * * *